United States Patent
Kim et al.

(10) Patent No.: US 11,446,579 B2
(45) Date of Patent: Sep. 20, 2022

(54) SYSTEM, SERVER AND METHOD FOR CONTROLLING GAME CHARACTER

(71) Applicant: NCSOFT Corporation, Seoul (KR)

(72) Inventors: Kyuhyun Kim, Seongnam-si (KR); Byungkyu Na, Seongnam-si (KR); Miseon Park, Seongnam-si (KR)

(73) Assignee: NCSOFT Corporation, Seoul (KR)

( * ) Notice: Subject to any disclaimer, the term of this patent is extended or adjusted under 35 U.S.C. 154(b) by 211 days.

(21) Appl. No.: 16/543,104

(22) Filed: Aug. 16, 2019

(65) Prior Publication Data
US 2020/0078682 A1 Mar. 12, 2020

(30) Foreign Application Priority Data

Sep. 11, 2018 (KR) .................. 10-2018-0108382
Sep. 21, 2018 (KR) .................. 10-2018-0113674

(51) Int. Cl.
| | | |
|---|---|---|
| *A63F 13/56* | (2014.01) | |
| *A63F 13/2145* | (2014.01) | |
| *A63F 13/424* | (2014.01) | |

(52) U.S. Cl.
CPC .......... *A63F 13/56* (2014.09); *A63F 13/2145* (2014.09); *A63F 13/424* (2014.09)

(58) Field of Classification Search
CPC .... A63F 13/56; A63F 13/2145; A63F 13/424; A63F 13/10; G06F 3/017; G06F 3/0482; G06F 3/0488; G06F 3/0484
See application file for complete search history.

(56) References Cited

U.S. PATENT DOCUMENTS

| | | | | |
|---|---|---|---|---|
| 6,244,956 | B1* | 6/2001 | Nakayama | A63F 13/5375 463/3 |
| 8,313,375 | B2* | 11/2012 | Yoro | A63F 13/2145 463/31 |
| 2007/0259716 | A1* | 11/2007 | Mattice | G06F 3/0488 463/36 |
| 2014/0179428 | A1* | 6/2014 | Miura | A63F 9/24 463/31 |
| 2015/0057056 | A1* | 2/2015 | Lee | A63F 13/573 463/2 |
| 2017/0239570 | A1* | 8/2017 | Iguchi | A63F 13/57 |
| 2018/0028918 | A1* | 2/2018 | Tang | G06F 3/0484 |
| 2019/0070496 | A1* | 3/2019 | He | A63F 13/54 |
| 2020/0122037 | A1* | 4/2020 | Kakizawa | A63F 13/56 |

* cited by examiner

*Primary Examiner* — William H McCulloch, Jr.
*Assistant Examiner* — Ankit B Doshi
(74) *Attorney, Agent, or Firm* — Sughrue Mion, PLLC

(57) ABSTRACT

A system, server, and method for controlling a game character are provided. The system for controlling a game character according to one embodiment includes a first user terminal configured to acquire an input of a first user, a server configured to generate game play information based on the input of the first user, and a second user terminal configured to perform at least one of control over a game character of a second user and provision of motion guidance information related to the game character based on the game play information.

20 Claims, 6 Drawing Sheets

SYSTEM, SERVER AND METHOD FOR CONTROLLING GAME CHARACTER

CROSS-REFERENCE TO RELATED APPLICATION(S)

This application claims the benefit under 35 USC § 119(a) of Korean Patent Applications No. 10-2018-0108382, filed on Sep. 11, 2018 and No. 10-2018-0113674, filed on Sep. 21, 2018, in the Korean Intellectual Property Office, the entire disclosure of which is incorporated herein by reference for all purposes.

BACKGROUND

1. Field

The following description relates to a system, server, and method for controlling a game character.

2. Description of Related Art

Various types of online game services that can be enjoyed with other users participating through a communication network are provided.

A role-playing game is a computer game in which each game user assumes a role of a character in a game program and acts out the role. A role-playing game player solves various quests while exploring an adventurous, fictional world according to the rules set by a game manager, thereby being able to feel interested as if he/she became a main protagonist in the game.

An online game is a computer game implemented to run on a wired or wireless network. An online game player can play a game with other people in remote locations through the wired or wireless network.

Particularly, games of massively multiplayer online role-playing game (MMORPG) type in which multiple users participate simultaneously and perform various quests in a game map implemented in a virtual space are gaining popularity.

In the process of playing the game, it often happens that a user should move to a specific position in the game or take a particular action in the game. At this time, the provision of information on the position to which a character needs to move or information on the particular action to be taken by the character may be implemented using various recognition techniques.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

In one general aspect, a system for controlling a game character includes a first user terminal configured to acquire an input of a first user, a server configured to generate game play information based on the input of the first user, and a second user terminal configured to perform at least one of control over a game character of a second user and provision of motion guidance information related to the game character based on the game play information.

The first user terminal may recognize start of the input of the first user based on at least one of a touch on a game screen, a click on the game screen, a voice, and a text.

The input of the first user may include at least one of a touch on a game screen, a click on the game screen, one or more voices, and one or more texts.

The first user terminal may acquire the input of the first user when the first user terminal acquires at least one of character control authority and guide authority from the second user.

The input of the first user may include information for identifying the game character.

The input of the first user may include information related to a motion of the game character.

When there are a plurality of inputs of the first user within a predetermined time interval, the server may generate the game play information based on a latest input among the plurality of inputs of the first user.

The second user terminal may control the game character for a predetermined period of time based on the game play information.

The second user terminal may provide the motion guidance information for a predetermined period of time based on the game play information.

In another general aspect, a server includes a communication device configured to communicate with a first user terminal and a second user terminal and a processor configured to receive an input of a first user from the first user terminal through the communication device, generate game play information based on the received input of the first user, and transmit the generated game play information to the second user terminal through the communication device.

In still another general aspect, a method of controlling a game character includes acquiring, at a first user terminal, an input of a first user, generating, at a server, game play information based on the input of the first user, and performing, at a second user terminal, at least one of control over a game character of a second user and provision of motion guidance information related to the game character based on the game play information.

The acquiring of the input of the first user may include recognizing start of the input of the first user based on at least one of a touch on a game screen, a click on the game screen, a voice, and a text.

The input of the first user may include at least one of a touch on a game screen, a click on the game screen, one or more voices, and one or more texts.

The acquiring of the input of the first user may include acquiring the input of the first user when at least one of character control authority and guide authority is acquired from the second user.

The input of the first user may include information for identifying the game character.

The input of the first user may include information related to a motion of the game character.

The generating of the game play information may include, when there are a plurality of inputs of the first user within a predetermined time interval, generating the game play information based on a latest input among the plurality of inputs of the first user.

The performing of the at least one of the control and the provision may include controlling the game character for a predetermined period of time based on the game play information.

The performing of the at least one of the control and the provision may include providing the motion guidance information for a predetermined period of time based on the game play information.

Other features and aspects will be apparent from the following detailed description, the drawings, and the claims.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

Detailed example embodiments of the inventive concepts are disclosed herein. However, specific structural and functional details disclosed herein are merely representative for purposes of describing example embodiments of the inventive concepts. Example embodiments of the inventive concepts may, however, be embodied in many alternate forms and should not be construed as limited to only the embodiments set forth herein.

Accordingly, while example embodiments of the inventive concepts are capable of various modifications and alternative forms, embodiments thereof are shown by way of example in the drawings and will herein be described in detail. It should be understood, however, that there is no intent to limit example embodiments of the inventive concepts to the particular forms disclosed, but to the contrary, example embodiments of the inventive concepts are to cover all modifications, equivalents, and alternatives falling within the scope of example embodiments of the inventive concepts.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the inventive concepts.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments of the inventive concepts. As used herein, the singular forms "a," "an," and "the" are intended to include the plural forms as well, unless the context clearly indicates otherwise. It will be further understood that the terms "comprises," "comprising," "includes," and/or "including", when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art.

In the following description, the same drawing reference numerals are understood to refer to the same elements, and a detailed description of known functions and configurations incorporated herein will be omitted when it may obscure the subject matter with unnecessary detail.

In the embodiments of the present disclosure, the terms "communication," "communication network," and "network" as used herein may be understood to have the same meaning. These three terms refer to a wired/wireless local-area and wide-area data transmission and reception network capable of transmitting and receiving a file between a user terminal, a terminal of another user, and a download server.

Hereinafter, embodiments of the present disclosure will be described in detail with reference to the accompanying drawings.

Figure 1:
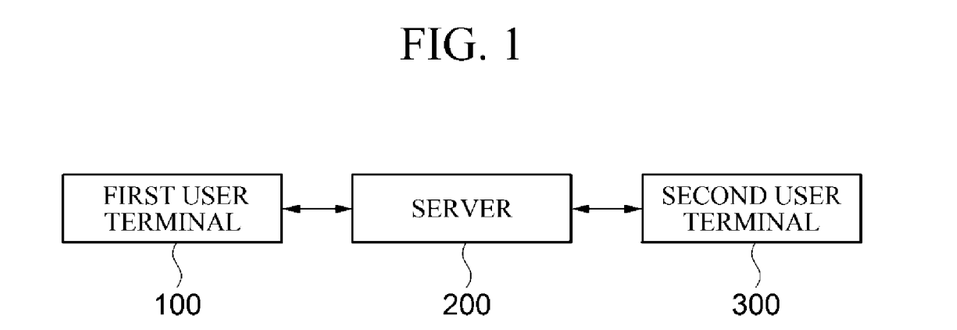
FIG. 1 is a diagram illustrating a system for controlling a game character according to one embodiment.

FIG. 1 is a diagram illustrating a system for controlling a game character according to one embodiment.

Referring to FIG. 1, the system for controlling a game character according to one embodiment includes a first user terminal 100, a server 200, and a second user terminal 300.

According to one embodiment, the first user terminal 100 or the second user terminal 300 may be a smartphone, a personal computer (PC), a notebook computer, a mobile phone, a tablet PC, a navigation terminal, a personal digital assistant (PDA), a smart TV, a portable multimedia player (PMP), or a digital broadcasting receiver, but is not limited thereto.

The server 200 may provide a game service to a plurality of user terminals connected thereto through a network.

The server 200 may provide game data (including data of game software and data related to game plays of other gamers) for playing a game.

Account information for each user terminal is stored in the server 200 in order to store a previous game play record.

Here, the term "server" used herein refers to a logical configuration unit and may not be necessarily a physically divided configuration element.

Figure 2:
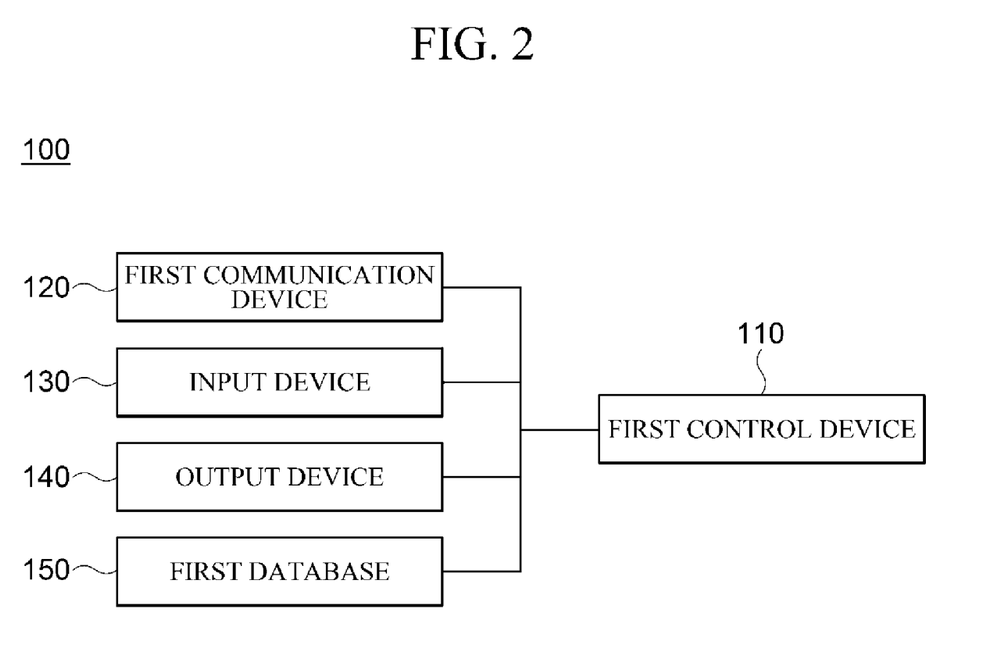
FIG. 2 is a diagram illustrating a configuration of a first user terminal according to one embodiment.

FIG. 2 is a diagram illustrating a configuration of a first user terminal according to one embodiment.

Referring to FIG. 2, the first user terminal 100 includes a first control device 110, a first communication device 120, an input device 130, an output device 140, and a first database 150.

The first control device 110, the first communication device 120, the input device, 130, the output device 140, and the first database 150 that constitute the first user terminal 100 may be mutually connected to one another and may transmit data to one another.

The first control device 110 manages information on the first user terminal 100 and an operation of the first user terminal 100.

The first control device 110 manages an operation of the input device 130.

The first control device 110 manages an operation of the output device 140.

The first control device 110 may set a condition for an input of a first user to be input to the input device 130.

The first control device 110 may include a memory (not shown) in which programs are stored and a processor (not shown) for executing the programs stored in the memory.

In this case, an operation program (e.g., an operating system (OS)) for operating the first user terminal 100 may be stored in the memory.

The first communication device 120 may be connected to the server 200 and the second user terminal 300 through a network.

The first communication device 120 transmits an input of the first user acquired by the input device 130 to the server 200 through the network.

The first communication device 120 may transmit at least one of character control authority (e.g., a character control acceptance signal) and guide authority (e.g., a guide acceptance signal) that are obtained by the input device 130 to the server 200 through the network.

The first communication device 120 receives game data transmitted by the server 200.

The first communication device 120 receives a control rejection signal which is transmitted by the server 200 or the second user terminal 300.

The first communication device 120 may receive character control authority (e.g., a character control acceptance signal) which is transmitted by the server 200 or the second user terminal 300.

The first communication device 120 may receive guide authority (e.g., a guide acceptance signal) which is transmitted by the server 200 or the second user terminal 300.

The first communication device 120 may receive a guide authority rejection signal which is transmitted by the server 200 or the second user terminal 300.

The input device 130 may recognize the start of the first user's input based on an event occurring in the first user terminal 100.

In this case, the event may include at least one of a touch on a game screen, click on the game screen, voice input (e.g., the first user utters "input"), and text input (e.g., the first user types "input" on a chat window).

The input device 130 may acquire an input of the first user after recognizing the start of the first user's input.

The input device 130 acquires the input of the first user related to the event.

In this case, the first user's input may include at least one of a voice (e.g., a location name), a plurality of voices at a time interval (e.g., a plurality of character names and an attack command), a touch on the game screen (e.g., a touch on a position on a game screen to which a game character should move or a touch on the game character), a click on the game screen (e.g., a click on a position on the game screen to which a game character should move or a click on the game character), and one or more texts (e.g., a location name, a character name, an attack command, and the like).

In addition, the first user's input includes at least one piece of information (e.g., a character name) for identifying a game character.

Also, the first user's input includes at least one piece of information (e.g., a position to which a game character should move) related to a motion of a game character.

The input device 130 may be provided integrally with the first user terminal 100.

The input device 130 may be provided coupled to the output device 150.

The input device 130 may be provided separately from the first user terminal 100.

The input device 130 may be a separate device connected to the first user terminal 100.

The input device 130 may include at least one of a touch screen, a mouse, a microphone, and a keyboard.

The input device 130 may acquire the first user's input when the first user acquires at least one of character control authority and guide authority from a party, blood alliance, a guild, or other users.

In addition, the input device 130 may acquire the first user's input when at least one of character control authority and guide authority from a second user who is a user of the second user terminal 300.

The input device 130 may combine the acquired input of the first user and at least one of the character control authority and the guide authority.

The input device 130 may acquire the input of the first user during a predetermined period of time.

The input device 130 may acquire the first user's input at a predetermined time interval.

The input device 130 may acquire the input of the first user only after a predetermined period of time (e.g., skill cast time) elapses after the control rejection signal is received.

The output device 140 displays the game screen of a game currently run on the first user terminal 100.

The output device 140 may display a graphical object (e.g., a virtual button) on the game screen for recognizing the first user's input.

In a case where there is an input of the first user, the output device 140 may indicate that the input of the first user is being input to the first user terminal 100 through the input device 130 by applying a specific effect to the graphical object for recognizing the first user's input or by using a motion of a game character of the first user. In addition, according to an embodiment, the output device 140 may indicate that the input of the first user is being input to the first user terminal 100 through the input device 130, by using text in addition to a graphical element.

For example, the output device 140 may remove the graphical object for recognizing the input of the first user from the game screen in order to inform that the input of the first user is being acquired.

In another example, the output device 140 may cause the game character of the first user, which is displayed on the game screen, to perform a specific motion (e.g., one hand on the waist, another hand pointing a game character of the second user in the game).

In another example, the output device 140 may display on the game screen an indication (e.g., a phrase "input in progress") to indicate that the input of the first user is being obtained.

Meanwhile, the output device 140 may display an indication (e.g., display a phrase "control rejection") to notify a control rejection signal transmitted by the server 200.

The output device 140 may be provided integrally with the first user terminal 100.

The output device 140 may be provided separately from the first user terminal 100.

The output device 140 may be a separate device connected to the first user terminal 100.

A program necessary for executing a game is stored in the first database 150.

Game data transmitted by the server 200 may be stored in the first database 150.

The input of the first user acquired by the input device 130 may be stored in the first database 150.

The control rejection signal which is transmitted by the server 200 or the second user terminal 300 may be stored in the first database 150.

The character control authority (e.g., a character control acceptance signal) which is transmitted by the server 200 or the second user terminal 300 may be stored in the first database 150.

The guide authority (e.g., a guide acceptance signal) which is transmitted by the server 200 or the second user terminal 300 may be stored in the first database 150.

The guide authority rejection signal which is transmitted by the server 200 or the second user terminal 300 may be stored in the first database 150.

According to another embodiment, the first user terminal 100 may generate game play information to be used for at least one of control over the game character of the second user and provision of motion guidance information related to the game character of the second user and transmit the game play information to the second user terminal 300 through the network.

Figure 3:
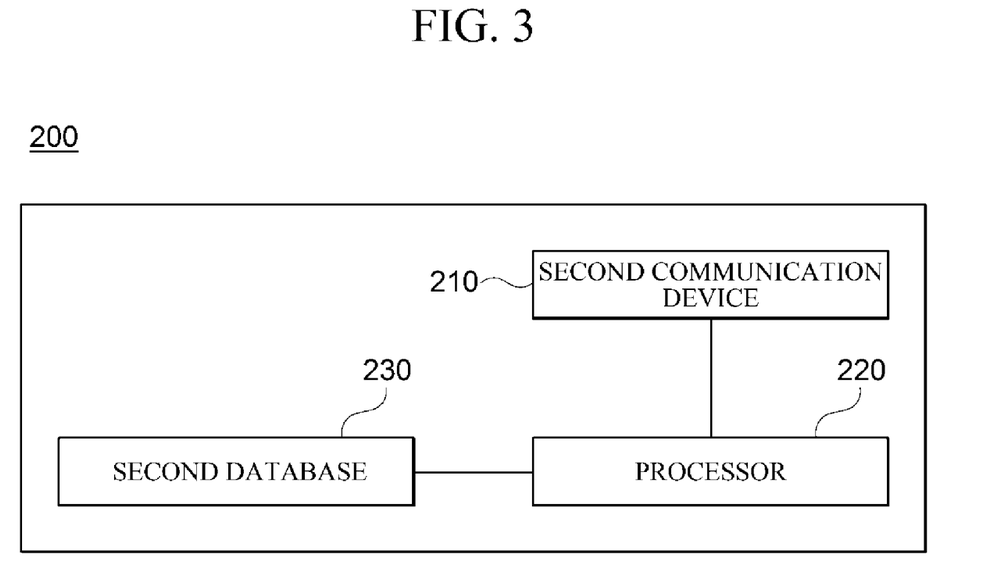
FIG. 3 is a diagram illustrating a configuration of a server according to one embodiment.

FIG. 3 is a diagram illustrating a configuration of a server according to one embodiment.

Referring to FIG. 3, the server 200 includes a second communication device 210, a processor 220, and a second database 230.

The second communication device 210, the processor 220, and the second database 230 that constitute the server 200 may be mutually connected to one another and may transmit data to one another.

The second communication device 210 is connected to a first user terminal 100 and a second user terminal 300 through a network.

The second communication device 210 receives a first user's input transmitted by the first user terminal 100.

The second communication device 210 transmits game data to the first user terminal 100 and the second user terminal 300.

The second communication device 210 transmits game play information generated by the processor 220 to the second user terminal 300.

The second communication device 210 may receive a control rejection signal transmitted by the second user terminal 300 and transmit the received control rejection signal to the first user terminal 100.

The second communication device 210 may receive character control authority (e.g., a character control acceptance signal) transmitted by the second user terminal 300 and transmit the received character control authority to the first user terminal 100.

The second communication device 210 may transmit guide authority (e.g., a guide acceptance signal) transmitted by the second user terminal 300 and transmit the received guide authority to the first user terminal 100.

The second communication device 210 may receive a guide authority rejection signal transmitted by the second user terminal 300 and transmit the received guide authority rejection signal to the first user terminal 100.

The processor 220 manages information related to the server 200 or an operation of the server 200.

i) Selection of First User's Input

The processor 220 acquires the first user's input transmitted by the first user terminal 100.

The processor 220 selects an input that can be used to generate the game play information from among inputs of the first user transmitted by the first user terminal 100.

In this case, when there are a plurality of inputs of the first user transmitted by the first user terminal 100, the processor 220 may select at least one of the plurality of inputs of the first user transmitted by the first user terminal 100.

For example, the processor 220 may select the latest input of the first user from among the plurality of inputs of the first user transmitted by the first user terminal 100.

In another example, the processor 220 may select an input of the first user transmitted first among the plurality of inputs of the first user transmitted by the first user terminal 100.

Meanwhile, the processor 220 may not select an input that cannot be used to generate the game play information from among the plurality of inputs of the first user transmitted by the first user terminal 100.

ii) Analysis of an Input of the First User

The processor 220 analyzes the selected input of the first user.

In this case, the input of the first user selected by the processor 220 may include at least one of one or more voices (e.g., a location name, a character name, an attack command, and the like), one or more texts (e.g., a location name, a character name, an attack command, and the like), a touch on the game screen, and a click on the game screen, and the processor 220 may analyze the selected input of the first user and output analytic information corresponding to the game information.

Specifically, when the input of the first user includes at least one of one or more voices and one or more texts, the processor 220 may analyze the voice and/or text included in the input of the first user and select one or more keywords (e.g., a character name, a location name, an attack command, a move command, and the like) related to game play. Also, the processor 220 may specify analytic information (e.g., a character name, a location name, an attack command, a move command, and the like) corresponding to the game information by analyzing the one or more selected keywords and output the specified analytic information.

In addition, when the input of the first user includes at least one of a touch on the game screen (e.g., a touch on a position on the game screen to which a game character should move or a touch on the game character) and a click on the game screen (e.g., a click on a position on the game screen to which a game character should move or a click on the game character), the processor 220 may specify the position and/or the game character in the game corresponding to the touch and/or click on the game screen included in the input of the first user and output analytic information for indicating the specified position and/or game character in the game.

iii) Generation of Game Play Information

The processor 220 generates game play information based on the input of the first user.

The processor 220 may generate the game play information based on the input of the first user when character control authority (e.g., a character control acceptance signal) is transmitted from the second user terminal 300. In this case, the processor 220 may generate the game play information such that a game character is controlled for a predetermined period of time (e.g., skill cast time).

Meanwhile, the processor 220 may generate the game play information based on the input of the first user when guide authority (e.g., a guide acceptance signal) is transmitted from the second user terminal 300. In this case, the processor 220 may generate the game play information such that motion guidance information is provided for a predetermined period of time (e.g., skill cast time).

The processor 220 may generate game play information including a character name, which is information for identifying a game character.

The processor 220 may generate game play information including a location name in order to control a game character or to provide motion guidance information related to the game character.

The processor 220 may generate game play information including skill information that matches a command (e.g., a move command or an attack command) in order to provide motion guidance information related to a game character.

The processor 220 may generate game play information including a motion control signal for controlling a motion of a game character.

The processor 220 may generate the game play information including a signal (e.g., a signal for showing "motion being under control" on the game screen) for informing that a motion of a game character is being controlled.

The processor 220 may generate game play information according to the order in which the inputs of the first user are analyzed.

The processor 220 may generate game play information based on analytic information related to the input of the first user.

The processor 220 may generate game play information in which one or more of a character name, a command, and a specific position in a game are combined.

The processor 220 may generate game play information by matching the analytic information and game information (e.g., a character name, position information, a skill name, movable area information, information on whether motion is possible, and the like).

In this case, the analytic information may include analytic information related to one or more keywords selected from at least one of one or more voices (e.g., a location name, a character name, an attack command, and the like) and one or more texts (e.g., a location name, a character name, an attack command, and the like).

In addition, the analytic information may include analytic information related to at least one of a touch on the game screen (e.g., a touch on a position on the game screen to which a game character should move or a touch on the game character) and a click on the game screen (e.g., a click on a position on the game screen to which a game character should move or a click on the game character).

iv) Check of Game Play Information

The processor 220 checks the generated game play information.

The processor 220 checks a target (e.g., a character name) of the generated game play information.

The processor 220 checks whether the generated game play information can be realized (e.g., whether it is possible to move to an unmovable area)

The processor 220 may modify the generated game play information (for example, add character names of the whole party members when a character name is not included). In this case, when it is not possible to modify the generated game play information, the processor 220 may invalidate said game play information.

The processor 220 may output the generated game play information.

The input of the first user transmitted by the first user terminal 100 is stored in the second database 230.

The game play information transmitted to the second user terminal 300 is stored in the second database 230.

The first user's input selected by the processor 220 is stored in the second database 230.

An analysis result obtained by the processor 220 is stored in the second database 230.

The game play information modified by the processor 220 is stored in the second database 230.

A control rejection signal transmitted by the second user terminal 300 is stored in the second database 230.

The control rejection signal transmitted to the first user terminal 100 is stored in the second database 100.

Character control authority (e.g., a character control acceptance signal) transmitted by the second user terminal 300 may be stored in the second database 230.

Character control authority (e.g., a character control acceptance signal) transmitted to the first user terminal 100 may be stored in the second database 230.

Guide authority (e.g., a guide acceptance signal) transmitted by the second user terminal 300 may be stored in the second database 230.

A guide authority rejection signal transmitted by the second user terminal 300 may be stored in the second database 230.

Guide authority (e.g., a guide acceptance signal) transmitted to the first user terminal 100 may be stored in the second database 230.

A guide authority rejection signal transmitted to the first user terminal 100 may be stored in the second database 230.

Figure 4:
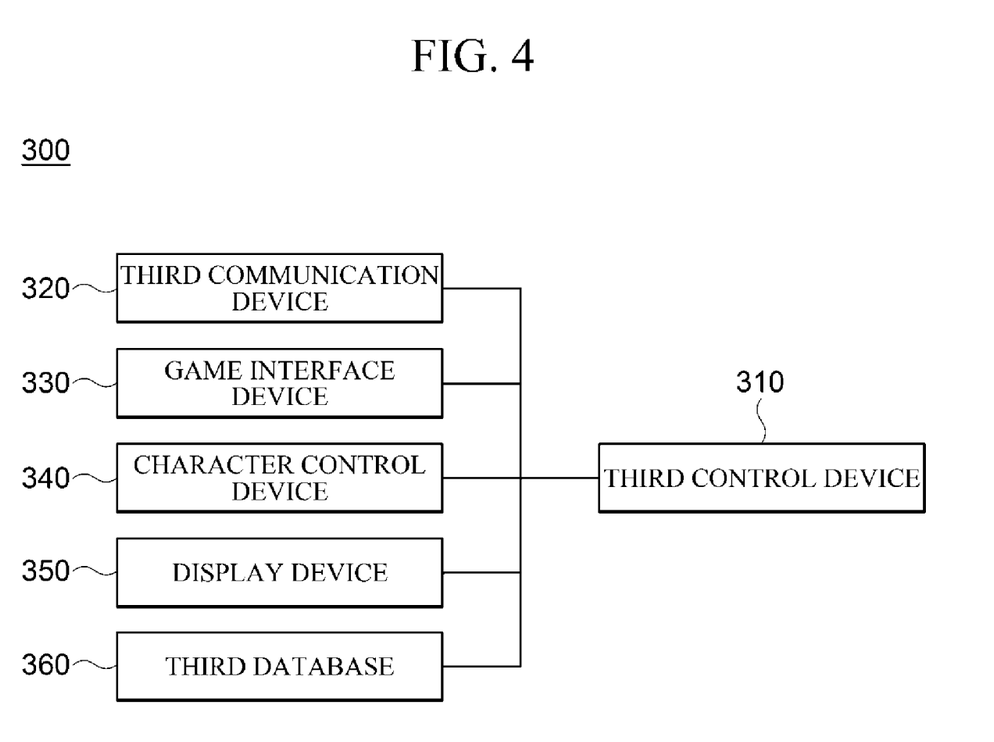
FIG. 4 is a diagram illustrating a configuration of a second user terminal according to one embodiment.

FIG. 4 is a diagram illustrating a configuration of a second user terminal according to one embodiment.

Referring to FIG. 4, the second user terminal 300 includes a third control device 310, a third communication device 320, a game interface device 330, a character control device 340, a display device 350, and a third database 360.

The third control device 310, the third communication device 320, the game interface device 330, the character control device 340, the display device 350, and the third database 360 that constitute the second user terminal 300 may be mutually connected to one another and may transmit data to one another.

The third control device 310 manages information on the second user terminal 300 and an operation of the second user terminal 300.

The third control device 310 manages an operation of the game interface device 330.

The third control device 310 manages an operation of the character control device 340.

The third control device 310 manages an operation of the display device 350.

The third control device 310 may include a memory (not shown) in which programs are stored and a processor (not shown) for executing the programs stored in the memory.

In this case, an operation program (e.g., OS) for operating the second user terminal 300 may be stored in the memory.

The third communication device 320 is connected to a server 200 and a first user terminal 100 through a network.

The third communication device 320 receives game play information transmitted by the server 200.

The third communication device 320 receives game data transmitted by the server 200.

The third communication device 320 transmits a control rejection signal, which is generated by the character control device 340, to the server 200.

The third communication device 320 transmits character control authority (e.g., a character control acceptance signal), which is output by the character control device 340, to the server 200.

The third communication device 320 transmits guide authority (e.g., a guide acceptance signal), which is output by the character control device 340, to the server 200.

The third communication device 320 transmits a guide authority rejection signal, which is generated by the character control device 340, to the server 200.

The third communication device 320 may transmit a control rejection signal, which is generated by the character control device 340, to the first user terminal 100.

The third communication device 320 may transmit character control authority (e.g., a character control acceptance signal), which is output by the character control device 340, to the first user terminal 100.

The third communication device 320 may transmit guide authority (e.g., a guide acceptance signal), which is output by the character control device 340, to the first user terminal 100.

The third communication device 320 may transmit a guide authority rejection signal, which is generated by the character control device 340, to the first user terminal 100.

The game interface device 330 provide a game control interface to enable a user of the second user terminal 300 to play a game using the second user terminal 300.

The game interface device 330 may be provided integrally with the second user terminal 300.

The game interface device 330 may be provided coupled to the display device 350.

The game interface device 330 may be provided separately from the second user terminal 300.

The game interface device 330 may be a separate device connected to the second user terminal 300.

The character control device 340 controls a game character in response to a motion control signal included in the game play information received through the third communication device 320.

The character control device 340 may generate an interface allowing for selecting whether to execute the motion control signal included in the game play information and may display the generated interface through the display device 350.

The character control device 340 may execute the motion control signal only when the user of the second user terminal 300 determines to execute the motion control signal in the generated interface.

The character control device 340 may generate a control rejection signal when the user of the second user terminal 300 rejects to execute the motion control signal in the generated interface.

The character control device 340 may display whether the motion control signal included in the game play information is executed through the display device 350 (for example, display a phrase "control signal being executed").

The character control device 340 may execute a game control input by the user of the second user terminal 300 through the game interface device 330 by giving priority over the motion control signal included in the game play information.

The character control device 340 may execute the motion control signal included in the game play information by giving priority over the game control input by the user of the second user terminal 300 through the game interface device 330.

The character control device 340 may generate an interface allowing for selecting whether or not character control authority is to be assigned and may display the generated interface through the display device 350.

When the user of the second user terminal 300 determines to assign the character control authority in the generated interface, the character control device 340 may output the character control authority (e.g., a character control acceptance signal).

The character control device 340 provides motion guidance information based on the game play information received through the third communication device 320.

The character control device 340 may display, through the display device 350, a position, to which a game character should move, included in the game play information.

The character control device 340 may display a move skill name included in the game play information through the display device 350.

The character control device 340 may display an attack target character included in the game play information through the display device 350.

The character control device 340 may display an attack skill name included in the game play information through the display device 350.

The character control device 340 may generate an interface allowing for selecting whether or not guide authority is to be assigned and may display the generated interface through the display device 350.

The character control device 340 may output the guide authority (e.g., a guide acceptance signal) when the user of the second user terminal 300 determines to assign the guide authority in the generated interface.

The character control device 340 may generate a guide authority rejection signal when the user of the second user terminal 300 rejects to assign the guide authority in the generated interface.

The display device 350 displays a game screen of a game running in the second user terminal 300.

The display device 350 may display the interface generated by the character control device 340.

The display device 350 may display whether or not the character control device 340 executes the motion control signal.

The display device 350 may be provided integrally with the second user terminal 300.

The display device 350 may be provided separately from the second user terminal 300.

The display device 350 may be a separate device connected to the second user terminal 300.

A program necessary for executing a game is stored in the third database 360.

The game data transmitted from the server 200 may be stored in the third database 360.

The game play information transmitted from the server 200 is stored in the third database 360.

The interface generated by the character control device 340 is stored in the third database 360.

The control rejection signal generated by the character control device 340 is stored in the third database 360.

The character control authority (e.g., a character control acceptance signal) output by the character control device 340 is stored in the third database 360.

The guide authority output by the character control device 340 is stored in the third database 360.

The guide authority rejection signal generated by the character control device 340 is stored in the third database 360.

The term "device or module" used herein refers to a logical configuration unit and may not be necessarily a physically divided configuration element.

Figure 5:
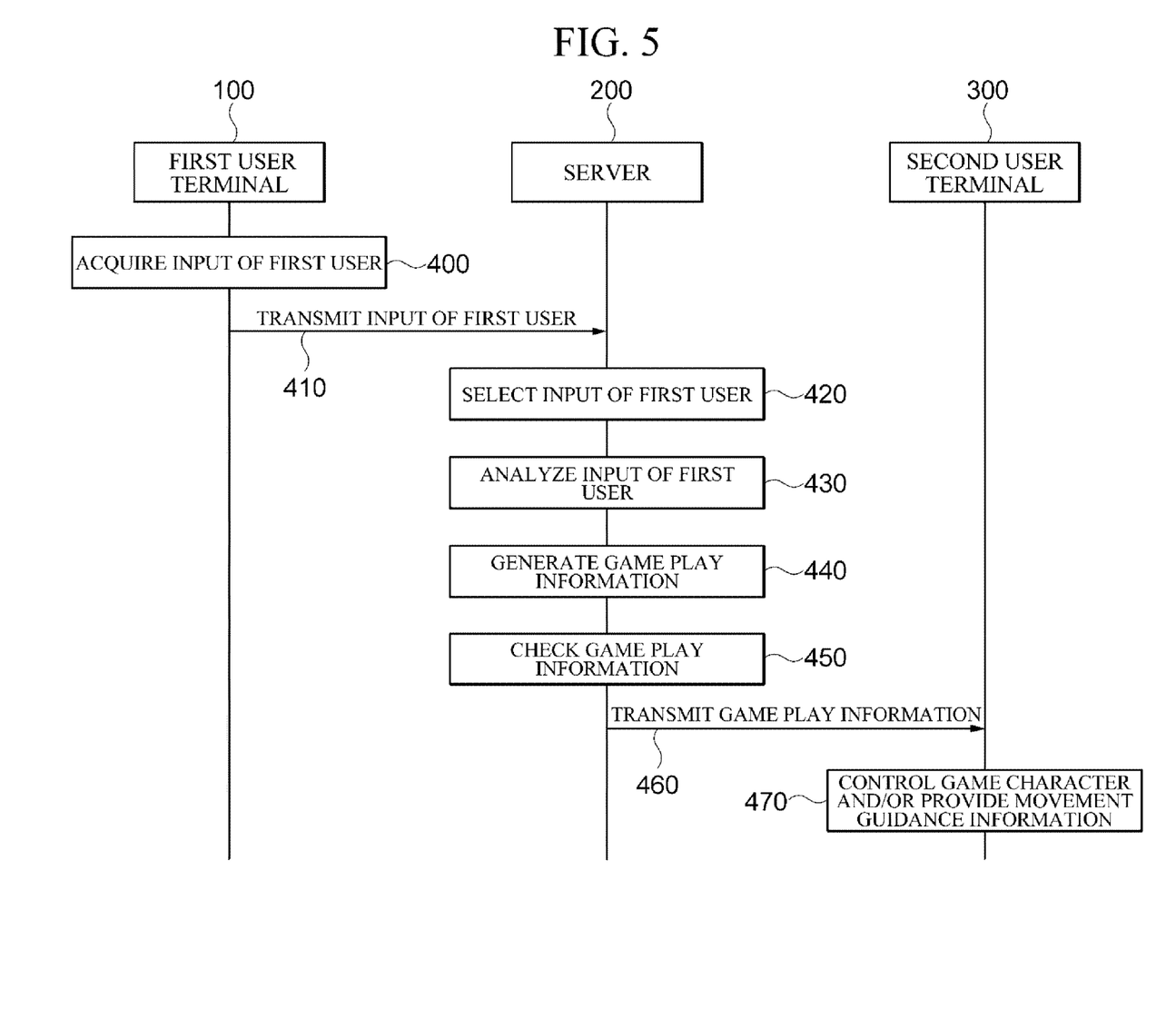
FIG. 5 is a flowchart illustrating a method of controlling a game character according to one embodiment.

FIG. 5 is a flowchart illustrating a method of controlling a game character according to one embodiment.

Referring to FIG. 5, first, a first user terminal 100 acquires an input of a first user (400).

In this case, the first user terminal 100 may acquire at least one of a touch on a game screen, a click on the game screen, one or more voices, and one or more texts as an input of the first user.

Then, the first user terminal 100 transmits the input of the first user to a server 200 (410).

In this case, the input of the first user may include one or more pieces of information related to a motion of a game character.

Then, the server 200 selects the input of the first user received from the first user terminal 100 (420).

In this case, when there are a plurality of inputs of the first user received within a predetermined time interval, the server may select the latest input from among the plurality of inputs of the first user.

Then, the server 200 analyzes the selected input of the first user (430).

In this case, the server 200 may analyze at least one of a touch on the game screen, a click on the game screen, one or more voices, and one or more texts.

Then, the server 200 generates game play information (440).

In this case, the server 200 may generate the game play information by matching analytic information related to the selected input of the first user and game information (e.g., a character name, a location name, a skill name, or the like).

Thereafter, the server 200 checks the generated game play information (450).

In this case, the server 200 may modify the generated game play information.

Then, the server 200 transmits the game play information to a second user terminal 300 (460).

The second user terminal 300 executes at least one of control over a game character of a second user and provision of motion guidance information based on the game play information received from the server 200 (470).

Figure 6A:
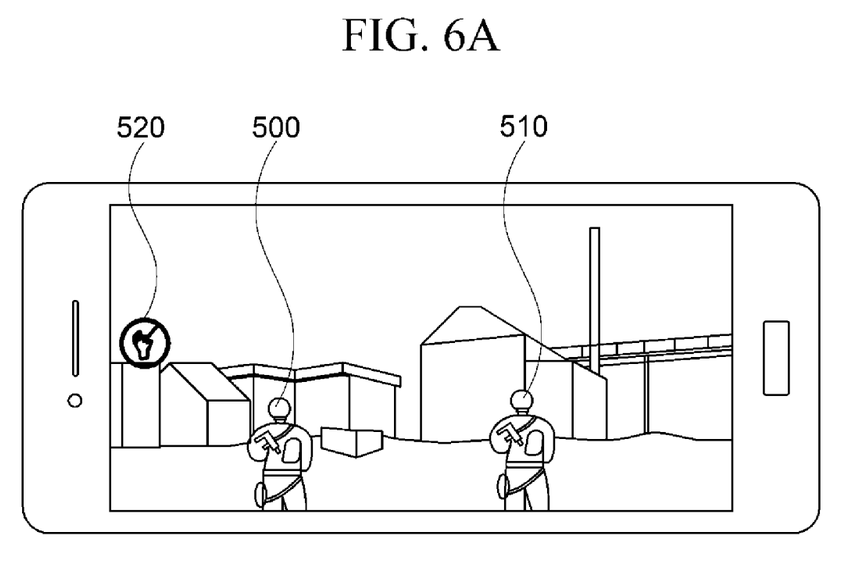
FIG. 6A and FIG. 6B are a diagram illustrating a state in which a game character of a second user is controlled to move to a designated position based on an input of a first user according to one embodiment.
Figure 6B:
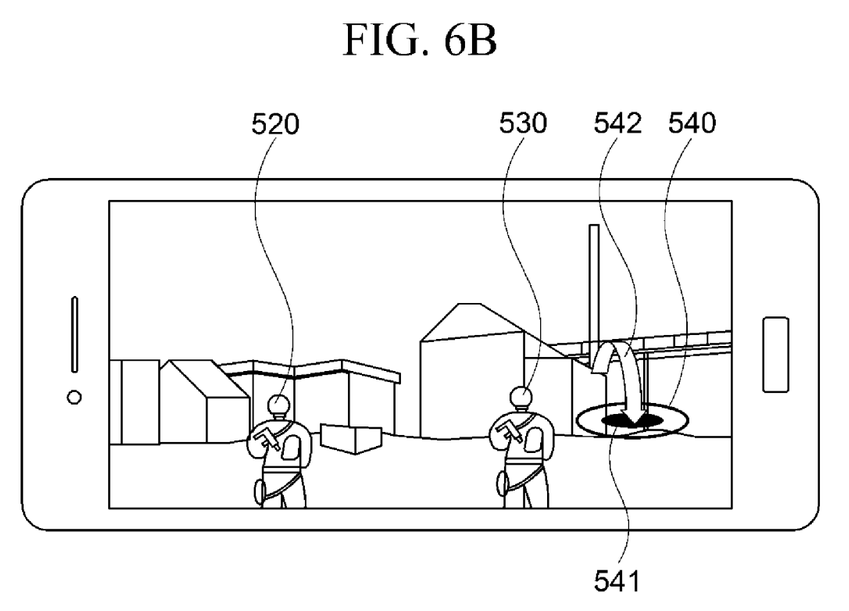

FIG. 6A and FIG. 6B are diagrams illustrating a state in which a game character of a second user is controlled to move to a designated position based on an input of a first user according to one embodiment.

FIG. 6A is a diagram illustrating a state in which a virtual button used for recognizing an input of a first user is displayed on a game screen and FIG. 6B is a diagram illustrating a state in which a game character of a second user is controlled to move to a designated position.

Referring to FIG. 6A, a game character of the first user is a game character 500 shown on the left side of the game screen and a game character of the second user is a game character 510 shown on the right side of the game screen.

The start of the input of the first user may be recognized by the first user's touch (or click) on, for example, the virtual button 520 displayed in the middle-left of the game screen.

In addition, the input of the first user may be a voice "Beginner, please move forward to the factory" which is uttered after the first user touches (or clicks) the virtual button 520.

Referring to FIG. 6B, the game character of the first user may be a game character 520 shown on the left side of the game screen and the game character of the second player may be a game character 530 shown on the right side of the game screen.

The game character 530 of the second user may be controlled to move to the bottom-right 540 of the game screen in response to game play information generated based on the input of the first user.

In addition, motion guidance information 541 and 542 based on the game play information generated on the basis of the input of the first user may be provided such that the game character 530 of the second user can move to the bottom-right 540 of the game screen.

For example, when the input of the first user is a voice, such as "Beginner, please move forward to the factory," "beginner," factory," and "move" may be selected from the voice as keywords related to game play. In this case, the game character 530 of the second user may be controlled to "move" forward to the "factory," which is a target place to move to, according to a motion control signal included in the game play information generated based on the selected keywords. In addition, the motion guidance information provided according to the game play information generated based on the selected keywords may be displayed in the form of an arrow 542 for indicating the "movement" of the "beginner" and a plurality of circles 540 and 541 for displaying the "factory," which is a target to which the "beginner" should move, in the game screen.

Meanwhile, according to an embodiment, an interface (not shown) allowing for selecting whether or not a motion control signal is executed so as to control the game character 530 of the second user to move to the bottom-right 540 of the game screen in accordance with the game play information may be displayed on the game screen of the second user. In this case, only when the execution of the motion control signal is determined through the interface displayed on the game screen of the second user, the motion control signal may be executed.

For example, in a case where the motion control signal is included in the input of the first user that is "Beginner, please move forward to the factory," when the execution of the motion control signal is determined in the interface displayed on the game screen of the second user, the game character of the second user may "move" forward to the "factory," which is a target to which the game character should move in response to the execution of the motion control signal.

Figure 7A:
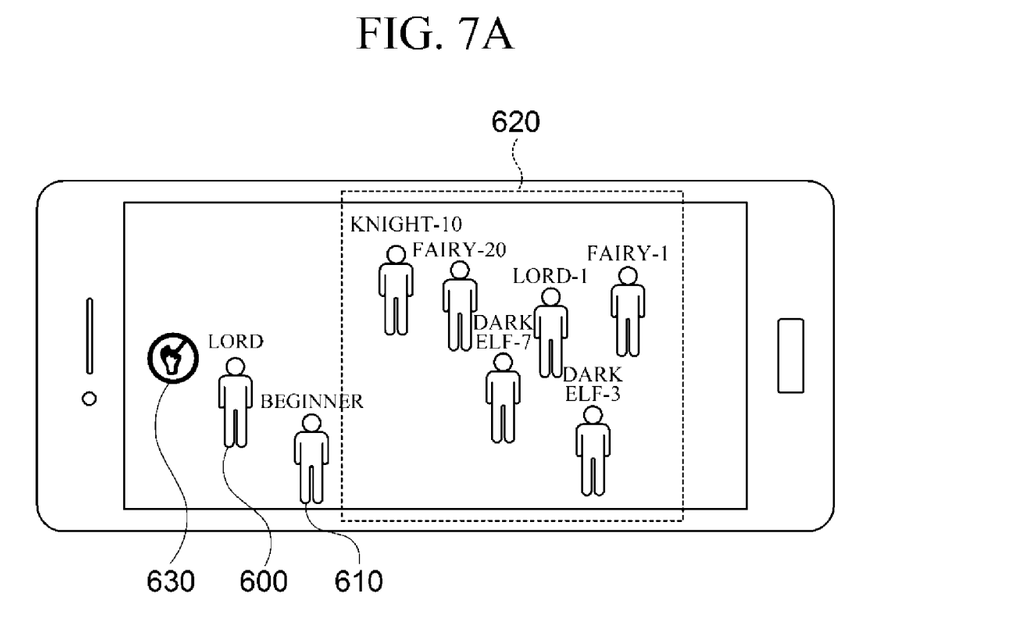
FIG. 7A and FIG. 7B are a diagram illustrating a state in which a game character of a second user is controlled to attack a designated player based on an input of a first user according to one embodiment.
Figure 7B:
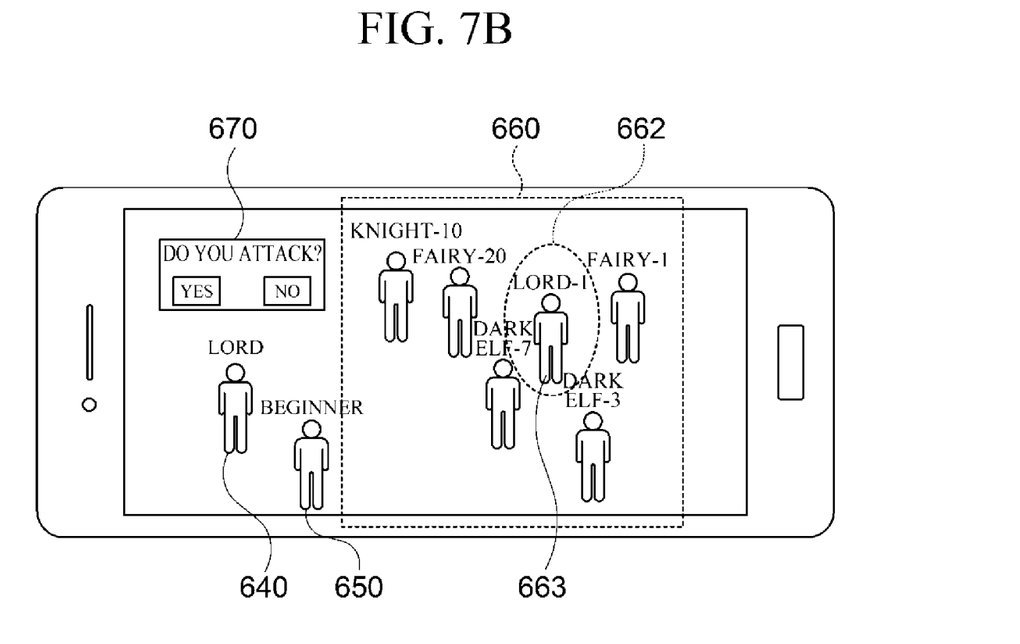

FIG. 7A and FIG. 7B are a diagram illustrating a state in which a game character of a second user is controlled to attack a designated player based on an input of a first user according to one embodiment.

FIG. 7A is a diagram illustrating a state in which a virtual button used for recognizing an input of a first user is displayed on a game screen and FIG. 7B is a diagram illustrating a state in which a game character of a second user is controlled to attack a designated player.

Referring to FIG. 7A, the game character of the first user is the first game character 600 on the left side of the game screen, the game character of the second user is the second game character 610 on the left side of the game screen, and the other characters 620 on the game screen are hostile characters.

The start of an input of the first user may be recognized by a touch (or click) on, for example, a virtual button 630 in the middle-left of the game screen.

In addition, the input of the first user may be a voice, such as "Beginner, please attack lord-1," which is uttered after the first user touches (or clicks) the virtual button 630.

Referring to FIG. 7B, the game character of the first user is the first game character 640 on the left side of the game screen, the game character of the second user is the second game character 650 on the left side of the game screen, and the other game characters 660 on the game screen are hostile game characters.

The game character 650 may be controlled to attack a designated game character 662 among the hostile game characters 660 in response to game play information generated based on the input of the first user.

Also, motion guidance information 663 based on the game play information generated based on the input of the first user may be provided on the game screen such that the game character of the second user 650 can attack the designated game character 662.

For example, in a case where the input of the first user is a voice, such as "Beginner, please attack lord-1," "beginner," "lord-1," and "attack" may be selected from the voice as keywords related to game play. In this case, according to a motion control signal included in the game play information generated based on the selected keywords, the game character 650 of the second user may be controlled to "attack" the "lord-1." In addition, the motion guidance information provided in accordance with the game play information generated based on the selected keywords may be displayed in the form of a character outline 663 for indicating the "lord-1" that is an "attack" target of the "beginner" on the game screen of the second user. In this case, the character outline 663 may be of a predetermined color (e.g., red).

Meanwhile, an interface 670 allowing for selecting whether or not the motion control signal is to be executed so as to control the game character 650 of the second user to attack the designated character 662 in accordance with the game play information may be displayed on the top left of the game screen of the second user.

In this case, the motion control signal may be executed only when the execution of the motion control signal is determined through the interface 670 displayed on the game screen of the second user.

For example, in a case where a motion control signal is included in an input of the first user which is "Beginner, please attack lord-1," when the execution of the motion control signal is determined in the interface 670 displayed on the game screen of the second user, the game character of the second user may "attack" the "lord-1" in response to the execution of the motion control signal.

In the description above, although all of the components of the embodiments of the present disclosure may have been explained as assembled or operatively connected as a unit, the present disclosure is not intended to limit itself to such embodiments. Rather, within the objective scope of the present disclosure, the respective components may be selectively and operatively combined in any numbers.

Every one of the components may be also implemented by itself in hardware while the respective ones can be combined in part or as a whole selectively and implemented in a computer program having program modules for executing functions of the hardware equivalents. Codes or code segments to constitute such a program may be easily construed by a person skilled in the art.

The computer program may be stored in computer readable media, which in operation can realize the aspects of the present disclosure. Examples of the computer readable media may include magnetic recording media, optical recording media, and carrier wave media.

In addition, unless explicitly described to the contrary, the terms "comprises," "comprising," "includes," and/or "including" will be understood to imply the inclusion of stated elements but not the exclusion of any other elements.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Although exemplary embodiments of the present disclosure have been described for illustrative purposes, those skilled in the art will appreciate that various modifications, additions and substitutions are possible, without departing from the scope and spirit of the disclosure. Therefore, exemplary embodiments of the present disclosure have not been described for limiting purposes. Accordingly, the scope of the disclosure is not to be limited by the above embodiments but by the claims and the equivalents thereof.

What is claimed is:

1. A system for controlling a game character comprising:
   a first user terminal configured to control playing of a game by controlling a first game character according to a first input of a first user, and acquire a second input of the first user during the playing of the game, the second input including information related to a motion of a second game character, the second input not controlling the first game character;
   a server configured to generate game play information based on the second input of the first user; and
   a second user terminal configured to control playing of the game by controlling the second game character of a second user, and perform, based on the game play information, at least one of control over the second game character to execute the motion corresponding to the second input of the first user and provision of motion guidance information for guiding the second game character to execute the motion corresponding to the second input of the first user, while the second user terminal continues to control playing of the game based on an input of the second user.

2. The system of claim 1, wherein the first user terminal is further configured to recognize start of the second input of the first user based on at least one of a touch on a game screen, a click on the game screen, a voice, and a text.

3. The system of claim 1, wherein the second input of the first user includes at least one of a touch on a game screen, a click on the game screen, one or more voices, and one or more texts, indicating a location on the game screen to which the second game character is to move.

4. The system of claim 1, wherein the first user terminal is further configured to acquire the second input of the first user when the first user terminal acquires at least one of character control authority and guide authority from the second user.

5. The system of claim 1, wherein the second input of the first user includes information for identifying the second game character.

6. The system of claim 1, wherein when there are a plurality of second inputs of the first user within a predetermined time interval, the server is further configured to generate the game play information based on a latest second input among the plurality of second inputs of the first user.

7. The system of claim 1, wherein the second user terminal is configured to control the second game character for a predetermined period of time based on the game play information.

8. The system of claim 1, wherein the second user terminal is further configured to perform, based on the game play information, the provision of the motion guidance information, and
wherein the second user terminal is configured to provide the motion guidance information, indicating a location on a game screen to which the second game character is to move, for a predetermined period of time based on the game play information.

9. The system of claim 1, wherein the second user terminal is further configured to display a visual indicator on a game screen indicating a start of the second input of the first user being acquired, prior to performing the at least one of control over the second game character and the provision of the motion guidance information.

10. The system of claim 1, wherein the second input of the first user indicates a location on a game screen to which the second game character is to move, and the second user terminal is configured to move, based on the game play information, the second game character to the location on the game screen corresponding to the second input of the first user.

11. The system of claim 1, wherein the second input of the first user indicates a location on a game screen to which the second game character is to move, and the second user terminal is configured to provide, based on the game play information, the motion guidance information, indicating to move the second game character to the location on the game screen corresponding to the second input of the first user, for a predetermined period of time.

12. A server comprising:
a communication device configured to communicate with a first user terminal and a second user terminal; and
a processor configured to:
provide data of a game to the first user terminal and the second user terminal to play the game, a first game character and a second game character of the game being respectively controlled by the first user terminal and the second user terminal;
receive, through the communication device, a first input controlling the first game character from a first user of the first user terminal during playing of the game;
receive, through the communication device, a second input of the first user from the first user of the first user terminal, the second input including information related to a motion of the second game character, the second input not controlling the first game character;
generate game play information based on the received second input of the first user, and
transmit, to the second user terminal through the communication device, the generated game play information, which is used to perform at least one of control over the second game character to execute the motion corresponding to the input of the first user and provision of motion guidance information for guiding the second game character to execute the motion corresponding to the second input of the first user, while the second user terminal continues to control playing of the game based on an input of a second user.

13. A method for controlling a game character, comprising:
controlling, at a first user terminal, playing of a game by controlling a first game character according to a first input of a first user, and acquiring a second input of the first user during the playing of the game, the second input including information related to a motion of a second game character, the second input not controlling the first game character;
generating, at a server, game play information based on the second input of the first user; and
controlling, at a second user terminal, playing of the game by controlling the second game character of a second user and performing, based on the game play information, at least one of control over the second game character to execute the motion corresponding to the second input of the first user and provision of motion guidance information for guiding the second game character to execute the motion corresponding to the second input of the first user, while the second user terminal continues to control playing of the game based on an input of the second user.

14. The method of claim 13, wherein the acquiring of the second input of the first user comprises recognizing start of the second input of the first user based on at least one of a touch on a game screen, a click on the game screen, a voice, and a text.

15. The method of claim 13, wherein the second input of the first user includes at least one of a touch on a game screen, a click on the game screen, one or more voices, and one or more texts, indicating a location on the game screen to which the second game character is to move.

16. The method of claim 13, wherein the acquiring of the second input of the first user comprises acquiring the second input of the first user when at least one of character control authority and guide authority is acquired from the second user.

17. The method of claim 13, wherein the second input of the first user includes information for identifying the second game character.

18. The method of claim 13, wherein the generating of the game play information comprises, when there are a plurality of second inputs of the first user within a predetermined time interval, generating the game play information based on a latest second input among the plurality of second inputs of the first user.

19. The method of claim 13, wherein the performing of the at least one of the control and the provision comprises controlling the second game character for a predetermined period of time based on the game play information.

20. The method of claim 13, wherein the performing of the at least one of the control and the provision comprises providing the motion guidance information for a predetermined period of time based on the game play information.

* * * * *